No. 760,189. PATENTED MAY 17, 1904.
A. P. GAINES & E. R. COX, Jr.
PLANT FOR FEEDING METALLURGICAL FURNACES.
APPLICATION FILED JAN. 21, 1904.
NO MODEL. 3 SHEETS—SHEET 1.
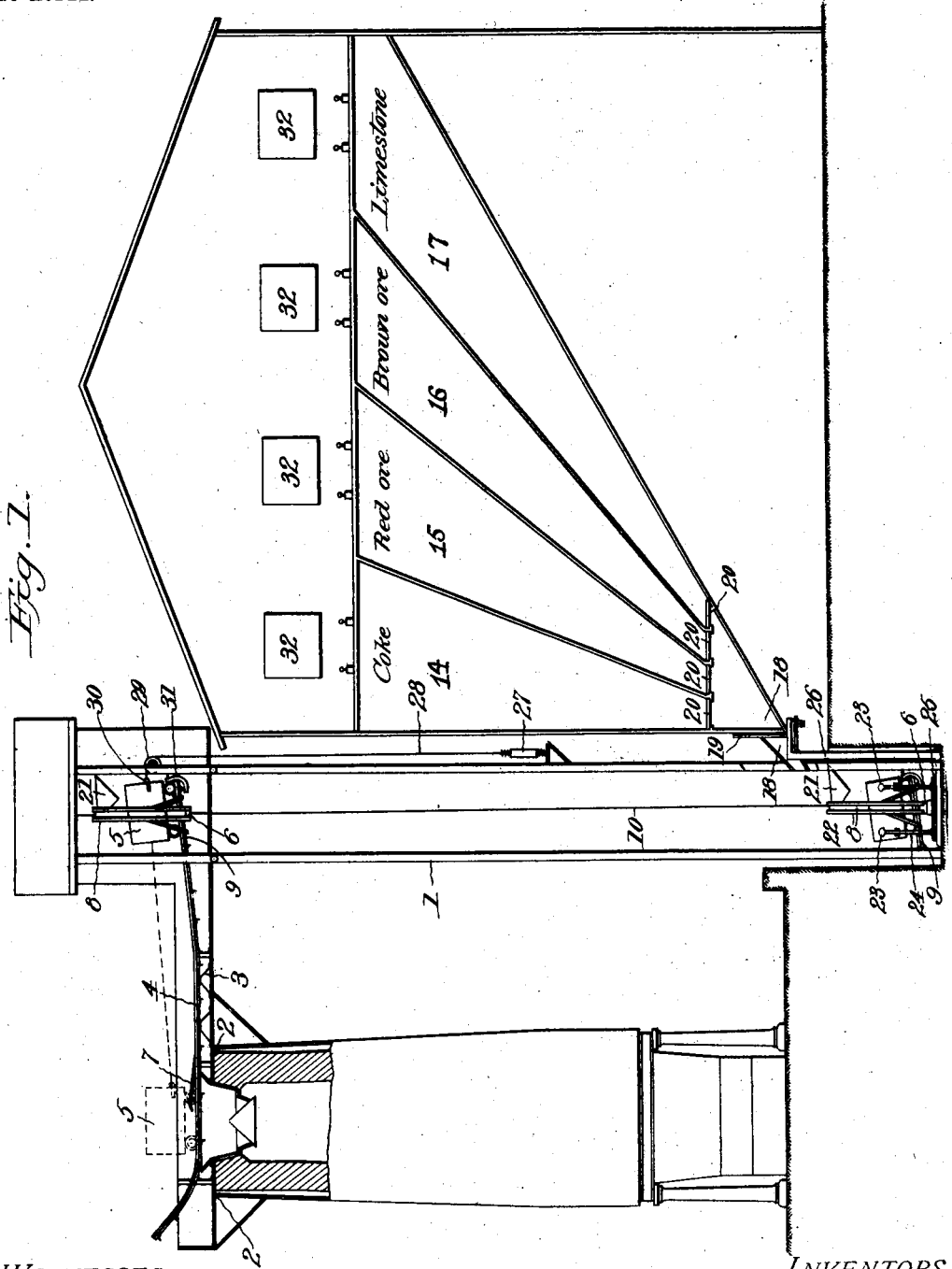
WITNESSES:
INVENTORS,
A. P. Gaines
E. R. Cox, Jr.
BY Howson & Howson,
Attorneys.

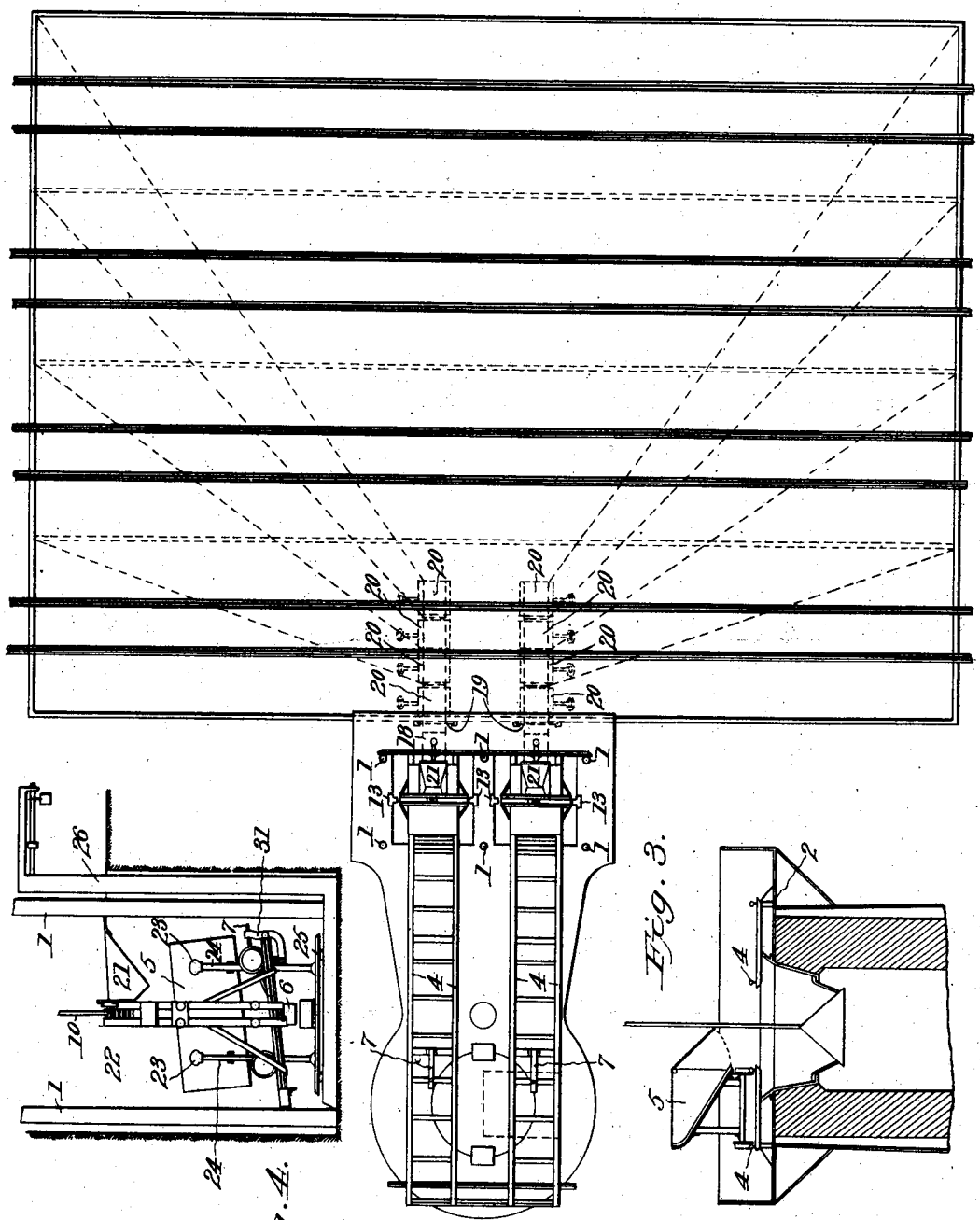

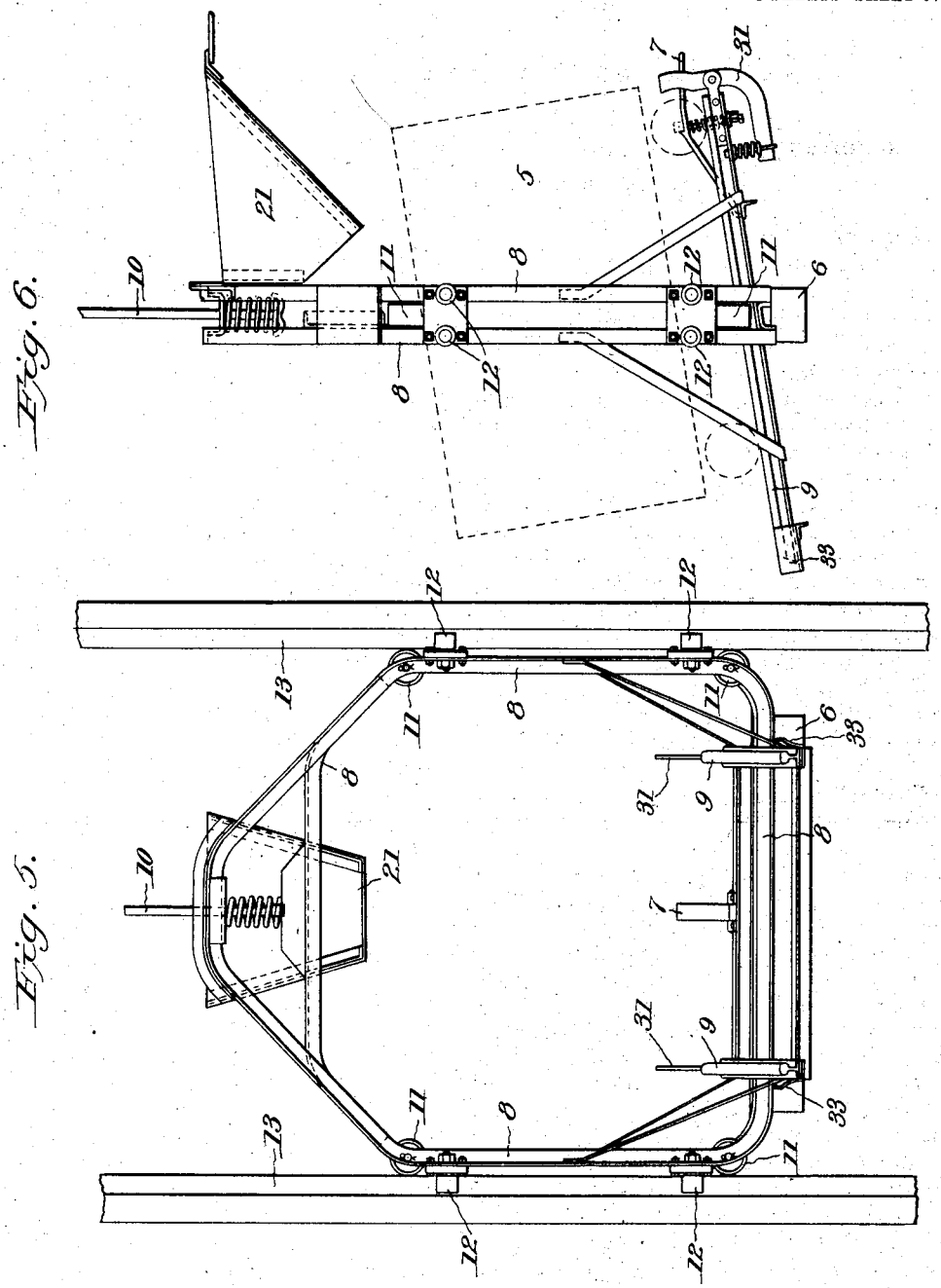

No. 760,189. Patented May 17, 1904.

UNITED STATES PATENT OFFICE.

AMBROSE P. GAINES, OF BESSEMER, AND EDWIN R. COX, JR., OF BIRMINGHAM, ALABAMA.

PLANT FOR FEEDING METALLURGICAL FURNACES.

SPECIFICATION forming part of Letters Patent No. 760,189, dated May 17, 1904.

Application filed January 21, 1904. Serial No. 190,068. (No model.)

*To all whom it may concern:*

Be it known that we, AMBROSE P. GAINES, a resident of Bessemer, and EDWIN R. COX, Jr., a resident of Birmingham, county of Jefferson, and State of Alabama, citizens of the United States, have invented certain new and useful Improvements in Plants for Feeding Metallurgical Furnaces, of which the following is a specification.

Our invention relates to plants for feeding material to blast-furnaces, and more especially to improvements in such plants as embody vertical hoists for elevating the car or other receptacle containing the material to the top of the furnace for delivery of the material thereinto; and our essential object is to so construct the hoist and appurtenant devices that they may be installed with least expense and operated with the greatest economy, while being adapted for ready application to existing vertical hoists.

Nearly all furnace plants using vertical hoists were built prior to the general introduction of the skip or incline hoist, and it entails a very large expense to reconstruct such furnaces for the incline hoist, often necessitating a new furnace, because the old shells are generally too thin to support the weight of such incline or skip hoist. Our invention, which secures all the advantages of the modern skip hoist, can be applied to all such furnaces at a cost so small as may well be considered merely nominal.

We attain the object indicated by the novel construction of furnace-feeding plant and details thereof, as hereinafter described with reference to the accompanying drawings and more particularly pointed out in the claims.

In the drawings, Figure 1 is a sectional elevation of a blast-furnace plant embodying our invention. Fig. 2 is a top plan view thereof. Fig. 3 is a sectional detail of the top of the furnace. Fig. 4 is an enlarged detail showing cage of hoist, scales, and car at lower level. Fig. 5 is an enlarged front view of cage, and Fig. 6 is an enlarged side view thereof.

Referring to the drawings, in which the same reference characters relate to the same or corresponding parts in all the views, the vertical structure 1 of the hoist is connected at the top by a bridge 3 with the furnace-top 2, upon which bridge the usual track 4 is laid, extending from the upper landing or platform of the hoist over the top of the furnace, so that material may be dumped from the car 5, traversable on the bridge between the hoist and furnace, said car preferably dumping from its side into the hopper and over the bell. This track is preferably inclined downwardly toward the furnace, so that the car 5 when released from the cage 6 at the upper landing may run to the furnace by gravity, suitable buffers, as upwardly-turned rail ends of the track 4, stopping the car in proper position over the hopper, where it is held by a spring-actuated pivoted latch 7 engaging a fixed part on the car, as the axle, until released by the operator to permit the car to be returned to the cage after its contents have been dumped into the furnace.

The cage structure 6 comprises a vertical closed frame 8, (see Figs. 5 and 6,) having top, bottom, and side bars or pieces, and preferably supports a short section of track 9, inclined to the same grade as the track 4 and adapted to be brought into alinement therewith when the cage is hoisted to the upper landing by its rope 10, attached to the upper bar or piece of the frame 8 and operated by a suitable hoisting-engine or winding-drum, (not shown,) but of common type. The rail ends of the track-section 9 are preferably provided with inclined guide-plates 33, which are adapted to engage the rail ends of the track 4 on the bridge 3 and bring the rails of the section 9 in alinement with the rails on the bridge. These guide-plates permit of certain latitude in landing the cage at the upper platform. A similarly-constructed pivoted latch 7 is mounted on the track-section 9 of the cage and adapted to hold the car 5 thereon by engagement with the axle or other fixed part thereof until released by the operator to permit the car to run down the track or to be pushed or hauled to the furnace-top and automatically engaging and locking said car in place on the cage when returned for lowering to receive another charge, and a pivoted spring-pressed buffer 31 opposite each wheel serves to check the car when it is drawn back upon the cage. The car may be automatically returned after the latch is released to its cage by a counterweight 27, suspended from a rope 28, running over a pulley 29 and having a hook which the operator attaches to a hook 30 on the car before he releases the latch on the cage to let the car run down to the furnace, or any suitable power mechanism may be used for this purpose, as well as for running the car to the furnace. The cage is preferable provided with a double set of guide-rollers 11 and 12, rotating in suitable bearings on the side bars of the frame 8. These rollers bear upon the faces and sides of the guides 13 of the hoist structure and restrain the cage in two horizontal directions at right angles to each other. The cage is lowered to the lower landing, which is preferably below the floor-level, so as to permit delivery of the stock into the car, where it is held stationary on the cage, either from cars or buggies running on said floor or from chutes 18 of open-topped bins 14, 15, 16, and 17, fed by cars 32 on tracks extending over said bins in the stock-house. The chute 18 is provided with a suitable swinging or sliding gate 19, while each bin has an opening communicating with said chute 18 and controlled by a suitable gate 20, the walls of the bins being inclined, so as to direct material toward such openings and chutes. The bin structure and the chutes 18 are sufficiently above the floor-level to permit cars or buggies to travel to the edge of the pit 22, so that the cage-car may be charged from such buggies or cars as well as from the bins, the latter of which, however, we prefer to use, the buggies being used whenever one or more of main bins should be short of material to convey stock from other storage-bins maintained for such emergencies.

Carried by the cage is a chute 21, fixed to the vertical frame 8, said chute being so adjusted that the stock may be delivered directly into the car from either the chutes 18 or cars or buggies running up to the edge of the pit 22.

The sides of the car 5 are provided with lugs or bosses 23, adapted to engage the top of the standards 24, supported upon the platform 25 of scales 26, so that the car will be entirely supported by said scales when the cage is at its lower landing and the contents of each charge conveniently weighed before hoisting.

In the operation of our improved hoist it will be observed that the car is held stationary on the cage at its lower landing, so that it may be filled and weighed without involving the extra labor and expense heretofore necessary in running the car or buggies to different places for filling either by mechanical or manual means and returning the same to the cage, and it is by this construction, involving a trifling cost of installation, we are able to secure such vital saving in cost of operation over the vertical hoists heretofore used, whereby all the mechanical advantages of the modern skip are secured in a vertical hoist without the great expense involved in the application of the latter to blast-furnaces.

In the drawings we have shown two hoists and two tracks, one on each side of the furnace, all the elements of which are identical in construction and mode of operation, so that the description of one applies to the other, and it may be noted that the tracks on the bridges are located so that the cars dump from the sides directly upon the bell in the hopper, as shown in Figs. 2 and 3, thus securing even distribution of the stock.

It is evident that all the operations at the top of the furnace may be made automatic, if desired; but as one man is required to operate the hoist and his best location, as at present in the vertical hoist now in use, is at the top of hoist and furnace, from which position he controls the hoisting-engine, it is considered better and greatly less expensive to have the release of the car and its transfer to and from the furnace controlled by him. Furthermore, this position gives him opportunity to inspect the bell and see that it is kept properly cooled and not injured by the heat and to note whether it is working properly, gage the height of the stock, watch the distribution of stock, and generally observe all the workings and guard against accident and imperfect feeding and distribution of material.

We claim as our invention—

1. In a plant for feeding materials to furnaces, the combination with a furnace, of a vertical hoist, a bridge connecting the furnace with said hoist, a cage operating in said hoist, a car carried by said cage and adapted to traverse the bridge to the furnace for discharging materials therein when the cage is at its upper landing, one or more bins provided with chutes arranged to deliver material into the car while held stationary on the cage at said landing, and means for weighing the loaded car at said lower landing before hoisting, substantially as described.

2. In a plant for feeding materials to furnaces, the combination with a furnace, of a vertical hoist, a bridge connecting said hoist with the furnace, a cage operating in said hoist, a car carried by said cage and adapted to traverse the bridge to the furnace for discharging its load into the same, one or more bins provided with chutes arranged to deliver material into the car while held stationary on the cage at said landing, and weighing-scales at the lower landing provided with means for supporting the car free from the cage for weighing the loaded car before hoisting, substantially as described.

3. In a plant for feeding materials to furnaces, the combination with a furnace, of a vertical hoist, a bridge connecting the hoist with the furnace, a cage operating in said hoist, a car carried by the cage and adapted to traverse the bridge between the upper landing of the hoist and the furnace for delivering materials thereto, and one or more bins provided with chutes arranged to deliver material into the car while held stationary in the cage at its lower landing, substantially as described.

4. In a plant for feeding materials to furnaces, the combination with a furnace, of a plurality of vertical hoists, bridges connecting said hoists with the furnace, a cage operating in each hoist, a car carried by each cage and adapted to traverse the bridge between the upper landing of its hoist and the furnace to deliver material thereto, and one or more bins having chutes arranged to deliver material into each car while it is held stationary in its cage at the lower landing, substantially as described.

5. In a plant for feeding materials to blast-furnaces, the combination with a furnace, of a hoist for elevating material to the furnace, a cage operating in said hoist, a charging-car carried by the hoist, a chute fixed to the cage and arranged to direct material into the car while it is held stationary on the cage for loading, substantially as described.

6. In a plant for feeding materials to furnaces, the combination with a furnace, of a vertical hoist, a bridge connecting the furnace and hoist, a cage operating in the hoist and provided with an inclined track-section, a locking device on the cage adapted to catch and hold the car as it is moved onto the cage until released by the operator for permitting the car to leave the cage, and one or more bins provided with chutes arranged to deliver material into the cage while held stationary on the cage at its lower landing, substantially as described.

7. In a plant for feeding materials to furnaces, the combination with a furnace, a vertical hoist and a bridge provided with a track connecting the hoist and furnace, of a cage carrying a track-section for holding a car, and inclined guide-plates on the rail ends of the track-section adapted to engage the rail ends of the bridge as the cage reaches the upper landing and thereby bring the rails of the track-section into alinement with the rails of the bridge, substantially as described.

8. In a plant for feeding materials to furnaces, the combination with a furnace, of one or more hoists for elevating material to the furnace, a cage for each hoist carrying a charging-car, an open-top bin structure divided by walls inclined toward the bottom, openings in the bottoms of the separate bins controlled by suitable gates, a chute into which the separate bins are adapted to discharge through the bottom openings of the bins and arranged to direct material into a charging-car at the lower landing of each hoist, and tracks above the bins over which cars may travel for feeding the same, substantially as described.

In testimony whereof we have signed our names to this specification in the presence of two subscribing witnesses.

AMBROSE P. GAINES.
EDWIN R. COX, Jr.

Witnesses:
J. B. FLOYD,
F. B. HILL.